United States Patent
Jeong et al.

(10) Patent No.: US 11,287,369 B2
(45) Date of Patent: Mar. 29, 2022

(54) SIGNAL AUGMENTATION METHOD IN SPECTROSCOPY DEVICE USING VAPOR CELL AND SPECTROSCOPY DEVICE USING THE SAME

(71) Applicant: KOREA RESEARCH INSTITUTE OF STANDARDS AND SCIENCE, Daejeon (KR)

(72) Inventors: Taek Jeong, Daejeon (KR); Han Seb Moon, Busan (KR); Dai Hyuk Yu, Daejeon (KR); Jae Hoon Lee, Daejeon (KR); Hyun Gue Hong, Seoul (KR)

(73) Assignee: KOREA RESEARCH INSTITUTE OF STANDARDS AND SCIENCE, Daejeon (KR)

(*) Notice: Subject to any disclaimer, the term of this patent is extended or adjusted under 35 U.S.C. 154(b) by 0 days.

(21) Appl. No.: 17/103,687

(22) Filed: Nov. 24, 2020

(65) Prior Publication Data

US 2021/0156794 A1 May 27, 2021

(30) Foreign Application Priority Data

Nov. 26, 2019 (KR) .................. 10-2019-0153027

(51) Int. Cl.
*G01N 21/31* (2006.01)
*G01J 3/42* (2006.01)
(Continued)

(52) U.S. Cl.
CPC ............ *G01N 21/3103* (2013.01); *G01J 3/12* (2013.01); *G01J 3/42* (2013.01); *G01J 3/4406* (2013.01);
(Continued)

(58) Field of Classification Search
None
See application file for complete search history.

(56) References Cited

U.S. PATENT DOCUMENTS 3,304,516 A * 2/1967 Novick ................ G01N 24/006
331/94.1
4,833,681 A * 5/1989 Akiyama ................ G01J 9/04
372/26
(Continued)

FOREIGN PATENT DOCUMENTS

JP 2011158384 A 8/2011
JP 2013171285 A 9/2013
(Continued)

OTHER PUBLICATIONS

Jacques, V., et al. "Nonlinear spectroscopy of rubidium: an undergraduate experiment." European journal of physics 30.5 (2009): 921. (Year: 2009).*

(Continued)

*Primary Examiner* — Shawn Decenzo
(74) *Attorney, Agent, or Firm* — Tarolli, Sundheim, Covell & Tummino LLP (57) ABSTRACT

A method is disclosed for increasing an intensity of a signal detected in a spectroscopy device using a vapor cell and a spectroscopy device using the same. An operation method of the spectroscopy device may include: causing a first light for exciting an atom trapped in a vapor cell in a first hyperfine ground state to a first excited state to be incident on the vapor cell; causing a second light for exciting an atom trapped in the vapor cell in a second hyperfine ground state to a second excited state to be incident on the vapor cell; causing a third light for exciting the atom in the second excited state to a third excited state to be incident on the vapor cell; and detecting fluorescence which is emitted while the atom in the third excited state returns to the ground state.

13 Claims, 9 Drawing Sheets

(51) Int. Cl.
*G01N 21/64* (2006.01)
*G01J 3/44* (2006.01)
*G01J 3/12* (2006.01)

(52) U.S. Cl.
CPC .. *G01N 21/6404* (2013.01); *G01J 2003/1252* (2013.01); *G01J 2003/423* (2013.01); *G01N 2021/3107* (2013.01)

(56) References Cited

U.S. PATENT DOCUMENTS

| | | | | |
|---|---|---|---|---|
| 4,856,899 | A * | 8/1989 | Iwaoka | G01J 9/04 |
| | | | | 356/454 |
| 11,190,195 | B1 * | 11/2021 | Camparo | H01S 1/06 |
| 2001/0045529 | A1 * | 11/2001 | Iketaki | G02B 21/16 |
| | | | | 250/493.1 |
| 2010/0233820 | A1 * | 9/2010 | Pantazis | C12Q 1/6818 |
| | | | | 436/94 |
| 2013/0215918 | A1 * | 8/2013 | Wilkinson | H01S 3/13 |
| | | | | 372/29.022 |
| 2014/0354275 | A1 * | 12/2014 | Sheng | G01R 33/26 |
| | | | | 324/244.1 |
| 2015/0015251 | A1 * | 1/2015 | Bulatowicz | G01R 33/26 |
| | | | | 324/304 |
| 2019/0164607 | A1 * | 5/2019 | Kaczmarek | G11C 13/048 |

FOREIGN PATENT DOCUMENTS

| | | |
|---|---|---|
| JP | 2016119351 A | 6/2016 |
| KR | 20190010522 A | 1/2019 |

OTHER PUBLICATIONS

Bowie, Jason, Jack Boyce, and Raymond Chiao. "Saturated-absorption spectroscopy of weak-field Zeeman splittings in rubidium." JOSA B 12.10 (1995): 1839-1842. (Year: 1995).*

Perrella, Christopher, et al. "High-resolution two-photon spectroscopy of rubidium within a confined geometry." Physical Review A 87.1 (2013): 013818. (Year: 2013).*

Korean Application No. 10-2019-0153027; Korean OA dated Jul. 21, 2021; 10 pgs.

* cited by examiner

SIGNAL AUGMENTATION METHOD IN SPECTROSCOPY DEVICE USING VAPOR CELL AND SPECTROSCOPY DEVICE USING THE SAME

CROSS REFERENCE TO RELATED APPLICATION

The present application claims the benefit of priority to Korean Patent Application No. 10-2019-0153027, filed in the Republic of Korea on Nov. 26, 2019, the entire contents of which are incorporated by reference herein for all purposes into the present application.

BACKGROUND

The present disclosure relates to a method for augmenting an intensity of a signal detected in a spectroscopy device using a vapor cell and a spectroscopy device using the same.

A spectroscopy device using an atomic vapor cell in which an atom exists in the form of an ideal gas is able to obtain a narrow and accurate frequency component of an atomic energy level due to interactions between the atom and a laser and able to constitute a simple system. Therefore, the spectroscopy device is widely being used in atomic clock study for time-frequency definition.

However, atoms within the atomic vapor cell moves thermally with Maxwell-Boltzmann velocity distribution. This causes linewidth to be extended by Doppler effect when the atoms interact with the laser, so that it is difficult to accurately measure a frequency. For solving this problem, spectroscopy without the Doppler effect, for example, saturated absorption spectroscopy (SAS), polarization spectroscopy (PS), etc., have been developed.

The limit of the frequency of the above-mentioned spectroscopies is determined by the linewidth of the atomic excited state. For example, in the case of a rubidium atomic vapor cell, the limit of the frequency linewidth measured by SAS and PS is about 6 MHz, that is, $5P_{1/2}$, $5P_{3/2}$ transition line natural linewidth. For the purpose of obtaining a more precise frequency, spectroscopy which is narrower than existing spectroscopies such as coherent population trapping (CPT), electromagnetically induced transparency (EIT), and two-photon absorption (TPA) has been developed and is being researched and used in the development of the atomic clock using the atomic vapor cell.

In such spectroscopies, a method for increasing the temperature of the vapor cell and injecting buffer gas, etc., are being used in order to increase the amplitude of a signal that can be obtained by the interaction between the laser and the atom. However, there are problems of having a limitation in increasing the temperature and of adding thermal noise.

SUMMARY

The object of the present invention is to provide a method capable of increasing the amplitude of a signal that can be obtained by the interaction between the laser and the atom in the above-described spectroscopies and a spectroscopy device using the same.

The technical problem to be overcome in this document is not limited to the above-mentioned technical problems. Other technical problems not mentioned can be clearly understood from those described below by a person having ordinary skill in the art.

One embodiment is a fluorescence measurement spectroscopy device including: a vapor cell trapping atoms; a first photodiode which generates a first light for exciting an atom trapped in the vapor cell in a first hyperfine ground state to a first excited state and causes the first light to be incident on the vapor cell; a second photodiode which generates a second light for exciting an atom trapped in the vapor cell in a second hyperfine ground state to a second excited state and causes the second light to be incident on the vapor cell; a reflection mirror which reflects the second light which has been generated by the second photodiode and has passed through from the vapor cell, and causes the second light to be incident again on the vapor cell; and a photodetector which detects fluorescence which is emitted while the atoms excited to a third excited state from the second excited state by the second light incident by the reflection mirror returns to the ground state.

Another embodiment is an absorption measurement spectroscopy device including: a vapor cell trapping atoms; a first photodiode which generates a first light for exciting an atom trapped in the vapor cell in a first hyperfine ground state to a first excited state and causes the first light to be incident on the vapor cell; a second photodiode which generates a second light for exciting an atom trapped in the vapor cell in a second hyperfine ground state to a second excited state and causes the second light to be incident on the vapor cell; a third photodiode which generates a third light for exciting the atom in the second excited state to a third excited state and causes the third light to be incident on the vapor cell; a photodetector which detects an intensity of the second light which has passed through the vapor cell; and a photo isolator which transmits only the second light among the lights which have passed through the vapor cell to the photodetector.

Further another embodiment is an operation method of the spectroscopy device. The operation method includes: causing a first light for exciting an atom trapped in a vapor cell in a first hyperfine ground state to a first excited state to be incident on the vapor cell; causing a second light for exciting an atom trapped in the vapor cell in a second hyperfine ground state to a second excited state to be incident on the vapor cell; causing a third light for exciting the atom in the second excited state to a third excited state to be incident on the vapor cell; and detecting fluorescence which is emitted while the atom in the third excited state returns to the ground state.

Yet another embodiment is an operation method of the spectroscopy device. The operation method includes: causing a first light for exciting an atom trapped in a vapor cell in a first hyperfine ground state to a first excited state to be incident on the vapor cell; causing a second light for exciting an atom trapped in the vapor cell in a second hyperfine ground state to a second excited state to be incident on the vapor cell; causing a third light for exciting the atom in the second excited state to a third excited state to be incident on the vapor cell; and detecting an intensity of the second light which has passed through the vapor cell.

According to various embodiments of the present invention, a two-photon absorption signal with a very low probability of obtaining can be increased, so that the temperature of the vapor cell where the atom-laser interaction occurs can be reduced as compared with conventional methods.

According to various embodiments of the present invention, the two-photon absorption signal with a very low probability of obtaining can be increased, so that the size of the vapor cell where the atom-laser interaction occurs can be reduced.

According to various embodiments of the present invention, the two-photon absorption signal with a very low probability of obtaining can be increased. As a result, the vapor cell is able to show the same performance even at a low temperature as compared with conventional methods, and the size of the vapor cell can be reduced, so that a more effective small-sized atomic clock can be developed.

Advantageous effects that can be obtained from the present disclosure are not limited to the above-mentioned effects. Further, other unmentioned effects can be clearly understood from the following descriptions by those skilled in the art to which the present disclosure belongs.

BRIEF DESCRIPTION OF THE DRAWINGS

With regard to the description of the drawings, the same or similar reference numerals may be used for the same or similar components.

DETAILED DESCRIPTION OF THE EMBODIMENTS

Hereinafter, various embodiments will be described in detail with reference to the accompanying drawings.

Figure 1:
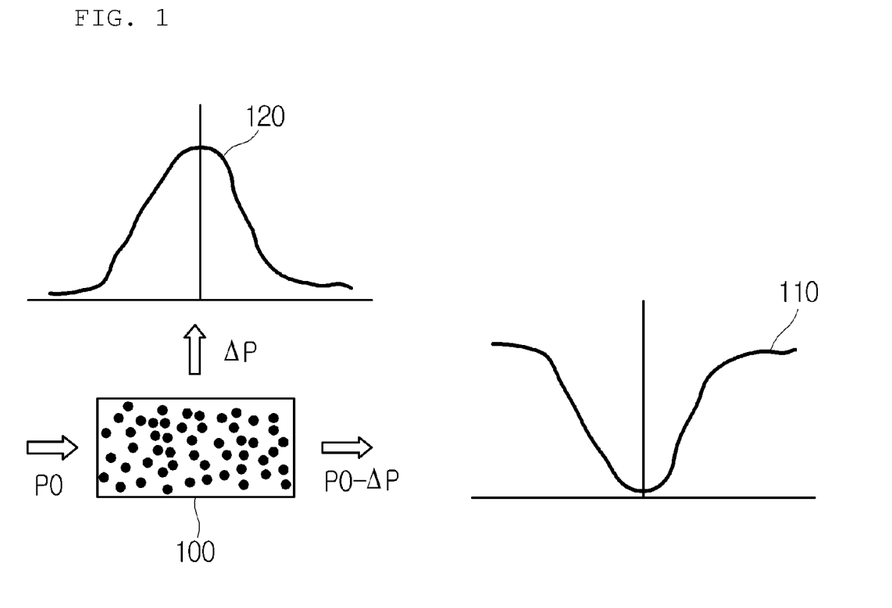
FIG. 1 is a view for describing the operation of a spectroscopy device according to an embodiment of the present disclosure.

FIG. 1 is a view for describing the operation of a spectroscopy device according to an embodiment of the present disclosure.

Referring to FIG. 1, a vapor cell 100 includes a plurality of atoms. When a laser light with an intensity of P0 is incident on the vapor cell, the laser light interacts with the atoms within the vapor cell 100, and thus, the level of the atom is changed. For example, if the energy of a photon incident on the vapor cell 100 is equal to the energy difference between the levels of the atoms contained in the vapor cell 100, these photons are effectively absorbed by the atom and the level of the atom is changed. In the measurement of the intensity 110 of each frequency of the light which has passed through the vapor cell 100, the intensity of the frequency band absorbed by the atom decreases. Meanwhile, the atom transferred to the excited state by absorbing the photon eventually falls to the ground state and emits the absorbed photon. At this time, the photon is emitted in a random direction, and the intensity 120 of each frequency is obtained by measuring the emitted photon. As shown in FIG. 1, by means of a photodetector, the spectroscopy device can measure (absorption-measure) the intensity of light rays from the right side or measure (fluorescence-measure) from the above the intensity of light rays emitted after being absorbed.

Figure 2:
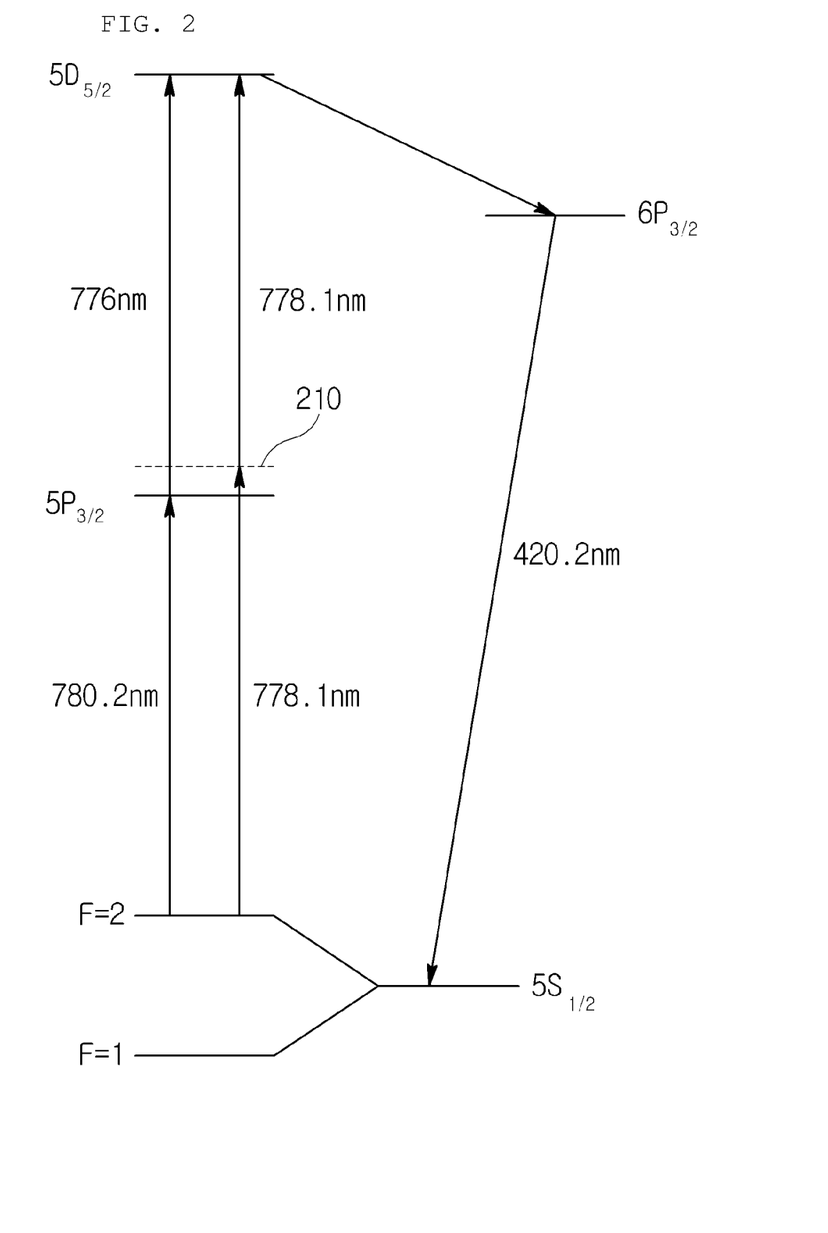
FIG. 2 is a view showing an energy level diagram of rubidium.

FIG. 2 is a view showing an energy level diagram of rubidium.

A rubidium atom may be used to generate a reference frequency of an atomic watch.

Referring to FIG. 2, the rubidium atom may be in a hyperfine ground state (F=1) or a hyperfine ground state (F=2) in a ground state $5S_{1/2}$. When the rubidium atom in the hyperfine ground state (F=2) absorbs a photon with a wavelength of 780.2 nm, the rubidium atom may be excited to an excited state $5P_{3/2}$. When the rubidium atom in the excited state $5P_{3/2}$ absorbs a photon with a wavelength of 776 nm again, the rubidium atom may be excited to an excited state $5D_{5/2}$. Then, in a certain period of time, the rubidium atom may return to the ground state $5S_{1/2}$ while emitting a photon with a wavelength of 420.2 nm after passing through an excited state $6P_{3/2}$. Here, the rubidium atom returning to the ground state $5S_{1/2}$ may return to the hyperfine ground state (F=1) or the hyperfine ground state (F=2). Here, two lasers, that is, a laser with a wavelength of 780.2 nm and a laser with a wavelength of 776 nm may be required to transit the rubidium atom in the hyperfine ground state (F=2) to the excited state through two-photon absorption.

According to another embodiment, only one laser with a wavelength of 778.1 nm may be used. The rubidium atom in the hyperfine ground state (F=2) may absorb a photon with a wavelength of 778.1 nm and be excited to an excited state 210 that is a hypothetical energy level around the excited state $5P_{3/2}$, and may absorb again the photon with a wavelength of 778.1 nm and be excited to the excited state $5D_{5/2}$. The advantage of using this method is that the number of required lasers can be reduced to one. Here, the excited state 210 is not the energy level existing in the rubidium atom, but a hypothetical energy level generated by the interaction between the rubidium atom and the photon with a wavelength of 778.1 nm.

As such, the use of the excitation by the two-photon absorption can prevent a linewidth from being extended by Doppler effect caused by thermal motion of the atom by Maxwell-Boltzmann velocity distribution.

In the example shown in FIG. 2, the spectroscopy device can obtain a more precise frequency by performing an absorption measurement in which the intensity of the laser which has a wavelength of 780.2 nm and is used to excite the rubidium atom in the hyperfine ground state (F=2) to the excited state $5P_{3/2}$ is measured or by performing a fluorescence measurement in which the intensity of the photon which has a wavelength of 420.2 nm and is emitted while the excited rubidium atom returns to the ground state $5S_{1/2}$ is measured. However, in the case of the fluorescence measurement, since the photon which is emitted by the rubidium atom is emitted in a random direction, the amount of the photon obtained by a photodetector which measures the intensity of a signal may be extremely small. Also, the rubidium atom may be in two hyperfine ground states (F=1 and F=2) in the ground state $5S_{1/2}$, and the rubidium atom which is excited by the above-described photon absorption may be in the hyperfine ground state (F=2). In general, the ratio of the rubidium atom in the hyperfine ground state (F=1) to the rubidium atom in the hyperfine ground state (F=2) may be about 5:3. Accordingly, only ⅝ of the rubidium atoms in the ground state within the vapor cell 100 can interact with the incident laser, absorb photons and be excited.

The present invention proposes a method by which atoms in the hyperfine ground state (F=1) can also be excited. Accordingly, the number of atoms interacting with the laser is increased, thereby increasing the amount of photons that can be obtained in the fluorescence measurement, or alternatively, increasing the amount of photons reduced by absorption in the absorption measurement, so that the intensity of the measurement signal can be increased.

Figure 3:
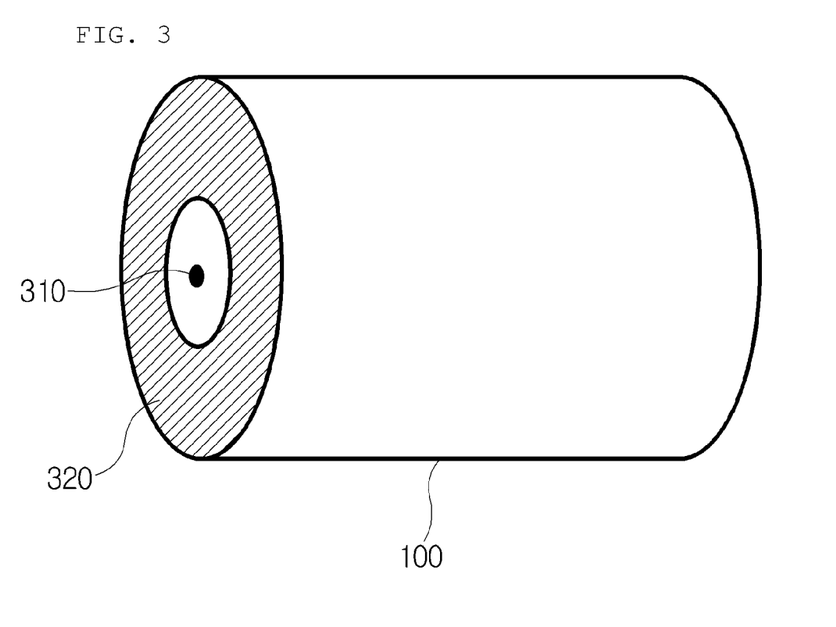
FIG. 3 is a view showing that an optical pumping laser for exciting an atom in a hyperfine ground state (F=1) is additionally incident on a vapor cell 100 in accordance with various embodiments of the present invention.

FIG. 3 is a view showing that an optical pumping laser for exciting the atom in the hyperfine ground state (F=1) is additionally incident on the vapor cell 100 in accordance with various embodiments of the present invention.

Figure 4A:
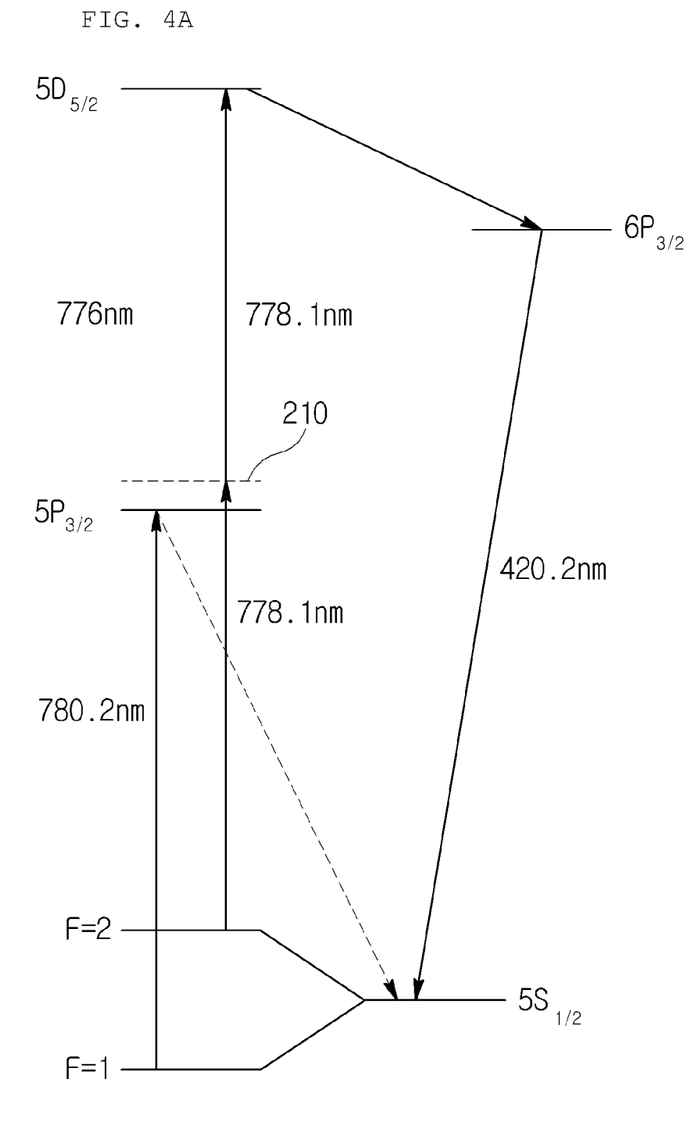
FIG. 4a is a view showing the energy level change of a rubidium atom in the vapor cell 100 by the optical pumping laser with a wavelength of 780.2 nm in accordance with various embodiments of the present invention.
Figure 4B:
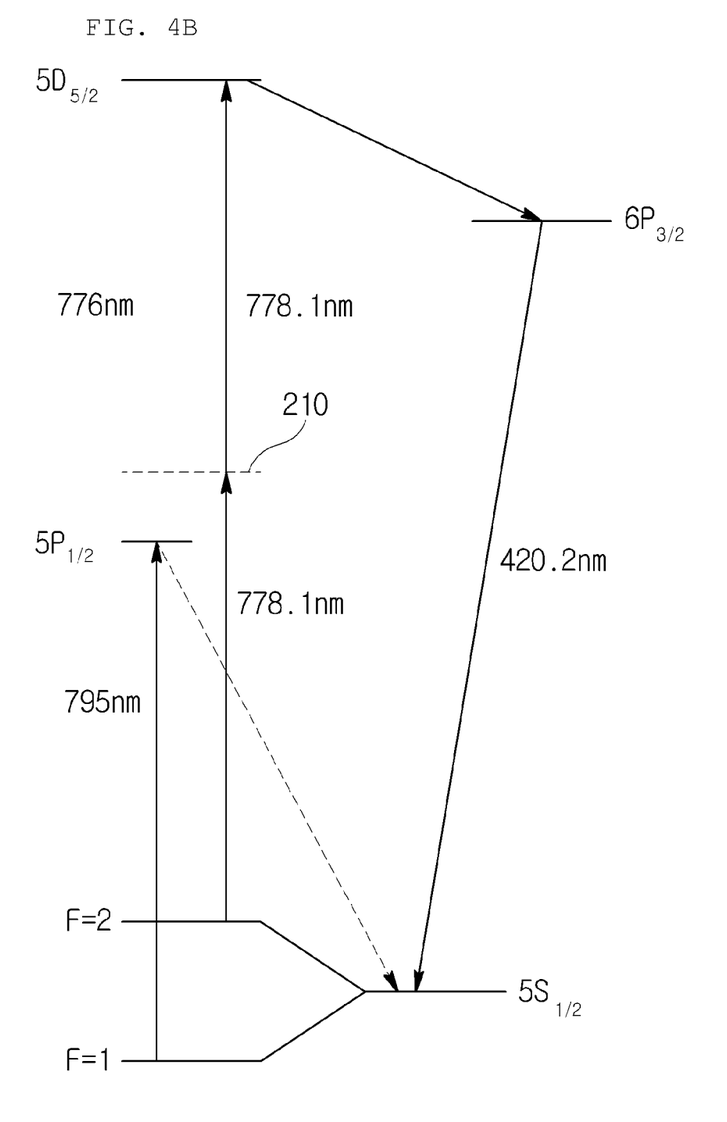
FIG. 4b is a view showing the energy level change of the rubidium atom in the vapor cell 100 by the optical pumping laser with a wavelength of 795 nm in accordance with various embodiments of the present invention.

Referring to FIG. 3, the spectroscopic apparatus proposed in the present invention may provide additionally the vapor cell 100 with a laser 320 for exciting the atom in the hyperfine ground state (F=1) to the excited state $5P_{3/2}$ or an excited state $5P_{1/2}$ in addition to a conventional laser 310 for exciting the atom in the hyperfine ground state (F=2) to the excited state 210. The laser 320 may have a wavelength of 795 nm or 780.2 nm. Here, as shown in FIGS. 4a and 4b, the laser with a wavelength of 795 nm may excite the atom in the hyperfine ground state (F=1) to the excited state $5P_{1/2}$, and the laser with a wavelength of 780.2 nm may excite the atom in the hyperfine ground state (F=1) to the excited state $5P_{3/2}$. Also, the laser 320 may be provided in such a way as to be irradiated to the outer periphery of the vapor cell 100 and to be spatially separated from the laser 310 and irradiated to as wide an area as possible. The laser 320 is irradiated to as wide an area as possible in order to make the amount of atoms in the hyperfine ground state (F=1) excited by the laser 320 as much as possible because atoms are randomly distributed in the vapor cell 100. Also, the laser 320 is spatially separated from the laser 310 because a nonlinear phenomenon is caused when the laser 310 and the laser 320 are coupled to each other.

In order to generate the donut-shaped laser 320 shown in FIG. 3, the center of a reflection mirror for generating a laser may have a round attachment attached thereto or a hole formed therein. According to another embodiment, Laguerre-gaussian mode beam is generated by using an optical vortex phase plate, so that the second donut-shaped laser 320 may be generated.

FIG. 4a is a view showing the energy level change of the rubidium atom in the vapor cell 100 by the optical pumping laser with a wavelength of 780.2 nm in accordance with various embodiments of the present invention.

Referring to FIG. 4a, the rubidium atom in the hyperfine ground state (F=1) may absorb a photon with a wavelength of 780.2 nm and be excited to the excited state $5P_{3/2}$. The rubidium atom excited to the excited state $5P_{3/2}$ can return to the ground state $5S_{1/2}$ because a photon with a wavelength capable of causing the rubidium atom to be excited to the excited state $5D_{5/2}$ is not provided. The rubidium atom returning to the ground state $5S_{1/2}$ may return to the hyperfine ground state (F=1) or the hyperfine ground state (F=2). The rubidium atom which has returned to the hyperfine ground state (F=1) may absorb again the photon with a wavelength of 780.2 nm and be excited to the excited state $5P_{3/2}$. Therefore, the rubidium atoms initially in the hyperfine ground state (F=1) move to the hyperfine ground state (F=2) while performing repeatedly process of being excited to the excited state $5P_{3/2}$ by the laser with a wavelength of 780.2 nm and returning to the ground state $5S_{1/2}$.

The rubidium atom in the hyperfine ground state (F=2) may absorb a photon with a wavelength of 778.1 nm and be excited to the excited state 210. The rubidium atom in the excited state 210 may absorb the photon with a wavelength of 778.1 nm once more and be excited to the excited state $5D_{5/2}$. The atom excited to the excited state $5D_{5/2}$ returns to the ground state $5S_{1/2}$ while emitting a photon of with a wavelength of 420.2 nm. Here, as the rubidium atoms initially in the hyperfine ground state (F=1) move to the hyperfine ground state (F=2) by the laser with a wavelength of 780.2 nm, the rubidium atoms in the hyperfine ground state (F=2) which interact with the laser with a wavelength of 778.1 nm and absorb two photons increase. Accordingly, in the fluorescence measurement, the amount of photons that can be obtained by the photodetector which detects light emitted while the rubidium atom returns to the ground state $5S_{1/2}$ may increase, and the intensity of the signal may increase.

FIG. 4b is a view showing the energy level change of the rubidium atom in the vapor cell 100 by the optical pumping laser with a wavelength of 795 nm in accordance with various embodiments of the present invention.

FIGS. 4b and 4a show the same energy level change, but are different in that the rubidium atom in the hyperfine ground state (F=1) is excited to the excited state $5P_{1/2}$ by using a laser with a wavelength of 795 nm as the optical pumping laser.

Referring to FIG. 4b, the rubidium atom in the hyperfine ground state (F=1) may absorb a photon with a wavelength of 795 nm and be excited to the excited state $5P_{1/2}$. The rubidium atom excited to the excited state $5P_{1/2}$ can return to the ground state $5S_{1/2}$ because a photon with a wavelength capable of causing the rubidium atom to be excited to the excited state $5D_{5/2}$ is not provided. The rubidium atom returning to the ground state $5S_{1/2}$ may return to the hyperfine ground state (F=1) or the hyperfine ground state (F=2). The rubidium atom which has returned to the hyperfine ground state (F=1) may absorb again the photon with a wavelength of 795 nm and be excited to the excited state $5P_{1/2}$. Therefore, the rubidium atoms initially in the hyperfine ground state (F=1) move to the hyperfine ground state (F=2) while performing repeatedly process of being excited to the excited state $5P_{1/2}$ by the laser with a wavelength of 795 nm and returning to the ground state $5S_{1/2}$.

The rubidium atom in the hyperfine ground state (F=2) may absorb a photon with a wavelength of 778.1 nm and be excited to the excited state 210. The rubidium atom in the excited state 210 may absorb the photon with a wavelength of 778.1 nm once more and be excited to the excited state $5D_{5/2}$. The atom excited to the excited state $5D_{5/2}$ returns to the ground state $5S_{1/2}$ while emitting a photon of with a wavelength of 420.2 nm. Here, as the rubidium atoms initially in the hyperfine ground state (F=1) move to the hyperfine ground state (F=2) by the laser with a wavelength of 795 nm, the rubidium atoms in the hyperfine ground state (F=2) which interact with the laser with a wavelength of 778.1 nm and absorb two photons increase. Accordingly, in the fluorescence measurement, the amount of photons emitted while the rubidium atom returns to the ground state $5S_{1/2}$ may be increased as much as the amount of atoms initially in the hyperfine ground state (F=1), and, in the fluorescence measurement, the amount of photons that can be obtained by the photodetector which detects emitted light may increase, and the intensity of the signal may increase.

Figure 5:
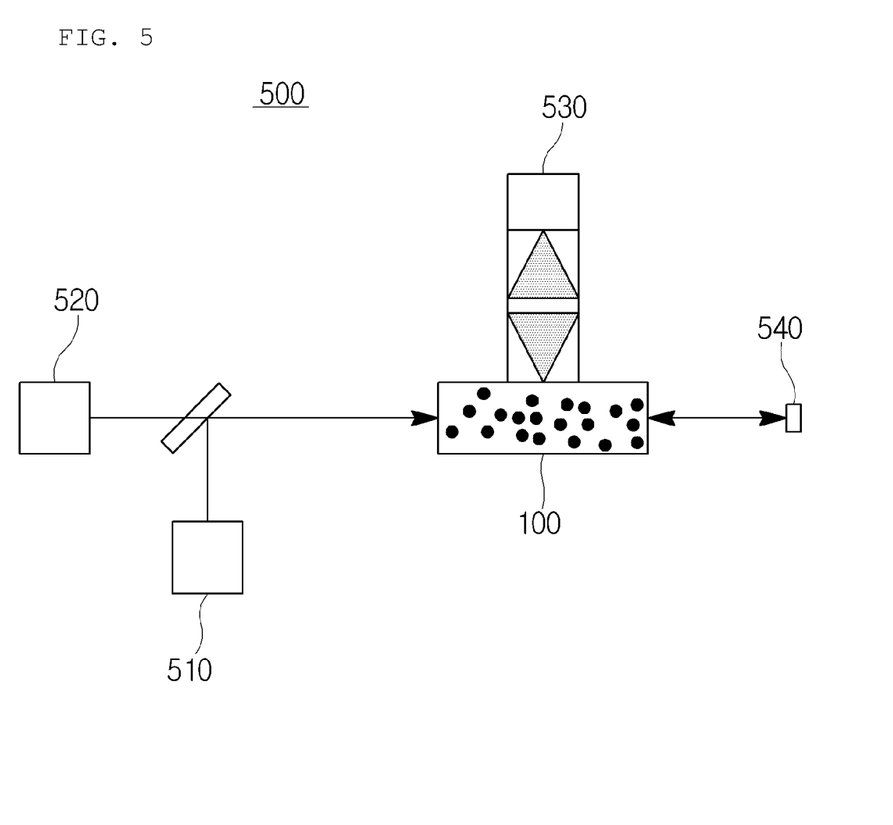
FIG. 5 is a view showing the configuration of a fluorescence measurement spectroscopy device 500 including the optical pumping laser in accordance with various embodiments of the present invention.

FIG. 5 is a view showing the configuration of a fluorescence measurement spectroscopy device 500 including the optical pumping laser in accordance with various embodiments of the present invention.

Referring to FIG. 5, the fluorescence measurement spectroscopy device 500 may include the vapor cell 100, a photodiode 510 providing the optical pumping laser, a photodiode 520 providing an interaction laser, and the photodetector (PD) 530 for detecting fluorescence, and a reflection mirror 540 for reflecting the interaction laser and causing the interaction laser to be incident on the vapor cell 100 again.

The vapor cell 100 may be filled with rubidium atoms.

The photodiode 510 may generate a donut-shaped laser light shown in FIG. 3 and cause the laser light to be incident on the vapor cell 100, and the laser light generated by the photodiode 520 may be, as shown in FIG. 3, incident on the vapor cell 100 from the center of the donut. The laser light generated by the photodiode 510 and the laser light generated by the photodiode 520 may be spatially separated.

The laser lights generated by the photodiode 510 and the photodiode 520 may have the same polarization.

Also, the laser lights generated by the photodiode 510 and the photodiode 520 may reach the reflection mirror 540 via the vapor cell 100, and the reflection mirror 540 may reflect only the laser light generated by the photodiode 520 for interaction and may cause the laser light to be incident on the vapor cell 100 again. The laser light incident again by the reflection mirror 540 may excite the atom in the excited state 210 to the excited state $5D_{5/2}$. According to the embodiment, since the laser light which is generated by the photodiode 510 and is incident on the vapor cell 100 and the laser light generated by the photodiode 520 are spatially separated, the size and position of the reflection mirror 540 may be determined such that only the laser light generated by 520 is reflected.

The optical pumping laser which is incident on the vapor cell 100 by the photodiode 510 may excite the atom in the hyperfine ground state (F=1) to the excited state $5P_{1/2}$ or the excited state $5P_{3/2}$. The Atoms in the excited state $5P_{1/2}$ or the excited state $5P_{3/2}$ may return to the ground state $5S_{1/2}$. Some of the atoms may return to the hyperfine ground state (F=1) and the other atoms may return to the hyperfine ground state (F=2). Further, the atom which has returned to the hyperfine ground state (F=1) may be excited again to the excited state $5P_{1/2}$ or the excited state $5P_{3/2}$ by the optical pumping laser generated by the photodiode 510. As such, the atoms initially in the hyperfine ground state (F=1) move to the hyperfine ground state (F=2) while performing repeatedly process of being excited and returning to the ground state by the optical pumping laser.

The laser which is incident on the vapor cell 100 by the photodiode 520 may excite the atom in the hyperfine ground state (F=2) to the excited state 210.

According to the embodiment, the photodiode 510 may cause the laser light with a wavelength of 795 nm or 780.2 nm to be incident on the vapor cell 100. When the laser light with a wavelength of 795 nm is incident on the vapor cell 100, the atom in the hyperfine ground state (F=1) may be excited to the excited state $5P_{1/2}$. When the laser light with a wavelength of 780.2 nm is incident on the vapor cell 100, the atom in the hyperfine ground state (F=1) may be excited to the excited state $5P_{3/2}$. The photodiode 520 may cause the laser light with a wavelength of 778.1 nm to be incident on the vapor cell 100.

The photodetector 530 may detect photons which are emitted while the atom excited to the excited state $5D_{5/2}$ returns to the ground state $5S_{1/2}$ after passing through the excited state $6P_{3/2}$. According to the embodiment, while returning from the excited state $6P_{3/2}$ to the ground state, the rubidium atom may emit a photon with a wavelength of 420.2 nm. The photodetector 530 may include a condensing lens for detecting the emitted photons and a filter capable of passing only the vicinity of a corresponding wavelength therethrough.

Referring to FIG. 5, compared to a conventional spectroscopy device, the spectroscopy device proposed in the present invention may further include the photodiode 510 in order to move the atom in the hyperfine ground state (F=1) to the hyperfine ground state (F=2) by optically pumping the atom in the hyperfine ground state (F=1).

Figure 6:
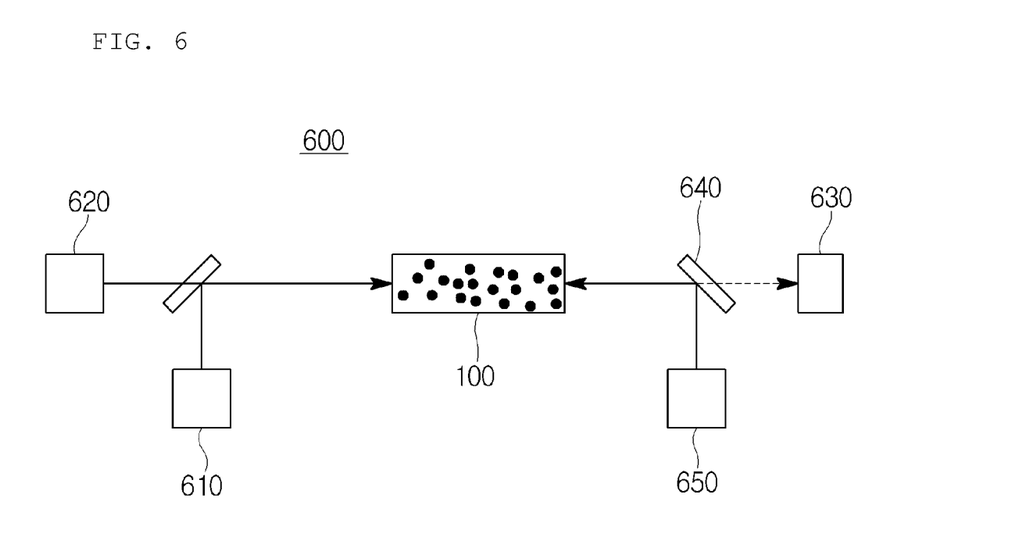
FIG. 6 is a view showing the configuration of an absorption measurement spectroscopy device 600 including the optical pumping laser in accordance with various embodiments of the present invention.

FIG. 6 is a view showing the configuration of an absorption measurement spectroscopy device 600 including the optical pumping laser in accordance with various embodiments of the present invention.

Referring to FIG. 6, the absorption measurement spectroscopy device 600 includes the vapor cell 100, a photodiode 610 which provides the optical pumping laser, a photodiode 620 which provides irradiation light, and a photodiode 650 which provides combined light, a photodetector (PD) 630 which detects the intensity of the irradiation light which has passed through the vapor cell 100, and a photo isolator 640 which transfers only the irradiation light to the photodetector 630.

The photodiode 610 may generate a donut-shaped laser light shown in FIG. 3 and cause the laser light to be incident on the vapor cell 100, and the laser light generated by the photodiode 620 and the photodiode 650 may be, as shown in FIG. 3, incident on the vapor cell 100 from the center of the donut. The laser light generated by the photodiode 610 may be spatially separated from the laser light generated by the photodiode 620 and the photodiode 650 and may be incident on the vapor cell 100.

The laser lights generated by the photodiode 610 and the photodiode 620 may have the same polarization.

The photodiode 650 may cause the combined light capable of providing photons capable of exciting the atoms excited to the excited state $5P_{3/2}$ to the excited state $5D_{5/2}$ to be incident on the vapor cell 100.

The optical pumping laser which is incident on the vapor cell 100 by the photodiode 610 may excite the atom in the hyperfine ground state (F=1) to the excited state $5P_{1/2}$ or the excited state $5P_{3/2}$. The Atoms in the excited state $5P_{3/2}$ or the excited state $5P_{1/2}$ may return to the ground state $5S_{1/2}$. Some of the atoms may return to the hyperfine ground state (F=1) and the other atoms may return to the hyperfine ground state (F=2). Further, the atom which has returned to the hyperfine ground state (F=1) may be excited again to the excited state $5P_{1/2}$ or the excited state $5P_{3/2}$ by the optical pumping laser generated by the photodiode 610. As such, the atoms initially in the hyperfine ground state (F=1) can move to the hyperfine ground state (F=2) while performing repeatedly process of being excited and returning to the ground state by the optical pumping laser. Here, the atoms in the excited state $5P_{3/2}$ may be excited to the excited state $5D_{5/2}$ by the combined light which is incident on the vapor cell 100 by the photodiode 650. However, since the area of the vapor cell 100 on which the optical pumping laser is incident is different from the area of the vapor cell 100 on which the combined light is incident, the atom excited to the excited state $5P_{3/2}$ from the hyperfine ground state (F=1) by the optical pumping laser cannot absorb the photon incident by the photodiode 650 and returns to the ground state $5S_{1/2}$.

The laser which is incident on the vapor cell 100 by the photodiode 620 may excite the atom in the hyperfine ground state (F=2) to the excited state $5P_{3/2}$.

The laser which is incident on the vapor cell 100 by the photodiode 650 may excite the atom in the excited state $5P_{3/2}$ to the excited state $5D_{5/2}$.

The atoms excited to the excited state $5D_{5/2}$ by absorbing photons provided by the combined light generated by the photodiode 650 may return to the ground state $5S_{1/2}$ via the excited state $6P_{3/2}$. Some of the atoms may return to the hyperfine ground state (F=1) and the other atoms may return to the hyperfine ground state (F=2). The atom which has returned to the hyperfine ground state (F=1) moves to the hyperfine ground state (F=2) by the optical pumping laser generated by the photodiode 610 and is then combined with the incident irradiation light and may be excited again to the excited state $5P_{3/2}$. Therefore, as the atoms in the hyperfine ground state (F=1) are also moved to the hyperfine ground state (F=2) by the optical pumping laser, the amount of atoms that can absorb the photons included in the irradiation light which is incident on the vapor cell 100 by the photodiode 620 can be increased.

According to the embodiment, the photodiode 610 may cause the laser light with a wavelength of 795 nm or 780.2 nm to be incident on the vapor cell 100. The photodiode 620 may cause the laser light with a wavelength of 780.2 nm to be incident on the vapor cell 100. The photodiode 650 may cause the laser light with a wavelength of 776 nm to be incident on the vapor cell 100. Here, the laser lights with a wavelength of 780.2 nm which is incident by the photodiode 610 and the photodiode 620 may be different from each other with a wavelength difference of approximately 0.01 nm.

The photo isolator 640 may transmit only the irradiation light which has been generated by the photodiode 620 and has passed through the vapor cell 100 to the photodetector 630.

The photodetector 630 may detect the irradiation light that is incident through the photo isolator 640. The atoms provided in the vapor cell 100 absorb the photons included in more irradiation light by the optical pumping laser by the photodiode 610 added according to the embodiment of the present invention, so that the signal of the corresponding frequency band can be more clearly attenuated by the photodetector 630. Therefore, the signal detected by the photodetector 630 can be clearer.

According to various embodiments, the fluorescence measurement spectroscopy device 500 may include a vapor cell trapping atoms (e.g., the vapor cell 100 of FIG. 5); a first photodiode (e.g., the photodiode 510 of FIG. 5) which generates a first light for exciting an atom trapped in the vapor cell in a first hyperfine ground state (e.g., the hyperfine ground state (F=1) of FIG. 4a or FIG. 4b) to a first excited state (e.g., the excited state $5P_{3/2}$ of FIG. 4a or the excited state $5P_{1/2}$ of FIG. 4b) and causes the first light to be incident on the vapor cell; a second photodiode (e.g., the photodiode 520 of FIG. 5) which generates a second light for exciting an atom trapped in the vapor cell in a second hyperfine ground state (e.g., the hyperfine ground state (F=2) of FIG. 4a or FIG. 4b) to a second excited state (e.g., the excited state 210 of FIG. 4a or FIG. 4b) and causes the second light to be incident on the vapor cell; the reflection mirror 540 which reflects the second light which has been generated by the second photodiode and has passed through from the vapor cell, and causes the second light to be incident again on the vapor cell; and a photodetector (e.g., the photodetector 530 of FIG. 5) which detects fluorescence which is emitted while the atoms excited to a third excited state (e.g., the excited state $5D_{5/2}$ of FIG. 4a of FIG. 4b) from the second excited state by the second light incident by the reflection mirror return to the ground state.

According to various embodiments, the area of the vapor cell on which the light generated by the first photodiode is incident and the area of the vapor cell on which the light generated by the second photodiode is incident may be spatially separated.

According to various embodiments, the atom may be a rubidium atom, the first light may have a wavelength of 795 nm or 780.2 nm, and the second light may have a wavelength of 778.1 nm.

According to various embodiments, the absorption measurement spectroscopy device 600 may include a vapor cell trapping atoms (e.g., the vapor cell 100 of FIG. 6); a first photodiode (e.g., the photodiode 610 of FIG. 6) which generates a first light for exciting an atom trapped in the vapor cell in a first hyperfine ground state (e.g., the hyperfine ground state (F=1) of FIG. 4a or FIG. 4b) to a first excited state (e.g., the excited state $5P_{3/2}$ of FIG. 4a or the excited state $5P_{1/2}$ of FIG. 4b) and causes the first light to be incident on the vapor cell; a second photodiode (e.g., the photodiode 620 of FIG. 6) which generates a second light for exciting an atom trapped in the vapor cell in a second hyperfine ground state (e.g., the hyperfine ground state (F=2) of FIG. 2) to a second excited state (e.g., the excited state $5P_{3/2}$ of FIG. 2) and causes the second light to be incident on the vapor cell; a third photodiode (e.g., the photodiode 650 of FIG. 6) which generates a third light for exciting the atom in the second excited state to a third excited state (e.g., the excited state $5D_{5/2}$ of FIG. 2) and causes the third light to be incident on the vapor cell; a photodetector (e.g., the photodetector 630 of FIG. 6) which detects an intensity of the second light which has passed through the vapor cell; and a photo isolator (e.g., the photo isolator 640 of FIG. 6) which transmits only the second light among the lights which have passed through the vapor cell to the photodetector.

According to various embodiments, the area of the vapor cell on which the first light generated by the first photodiode is incident and the area of the vapor cell on which the second light generated by the second photodiode is incident may be spatially separated.

According to various embodiments, the atom may be a rubidium atom, the first light may have a wavelength of 795 nm or 780.2 nm, the second light may have a wavelength of 780.2 nm, and the third light may have a wavelength of 776 nm.

According to various embodiments, the area where the second light and the third light are incident on the vapor cell is the center of the vapor cell, and the area where the first light is incident on the vapor cell has a donut shape and may include from the periphery of the area where the second light is incident to the outer periphery of the vapor cell.

Figure 7:
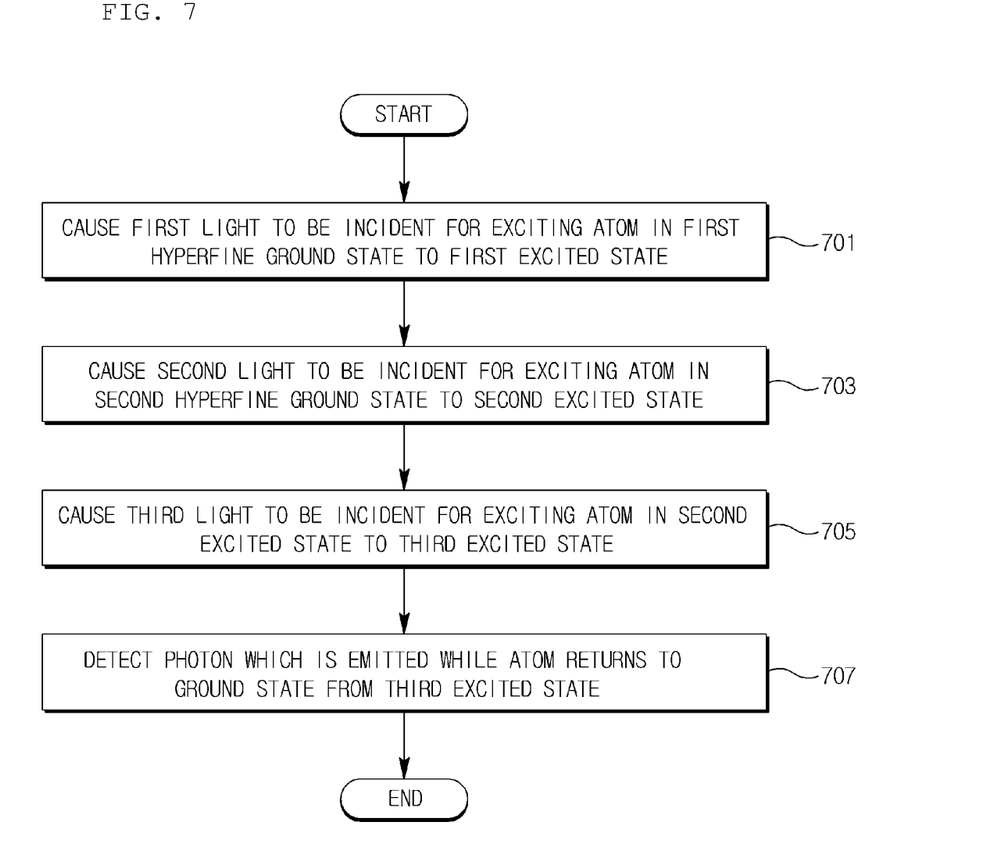
FIG. 7 is a flowchart showing the operation of a fluorescence measurement spectroscopy device according to various embodiments of the present invention.

FIG. 7 is a flowchart showing the operation of the fluorescence measurement spectroscopy device according to various embodiments of the present invention.

Referring to FIG. 7, in operation 701, the fluorescence measurement spectroscopy device 500 may cause the first light which excites an atom trapped in the vapor cell 100 in the hyperfine ground state (F=1) to the excited state $5P_{1/2}$ or the excited state $5P_{3/2}$ to be incident on the vapor cell 100. Here, the first light may have a wavelength of 795 nm or 780.2 nm. The atom excited to the excited state $5P_{1/2}$ or the excited state $5P_{3/2}$ by the first light may return to the ground state $5S_{1/2}$. Some of the atoms may return to the hyperfine ground state (F=1) and the other atoms may return to the hyperfine ground state (F=2). Further, the atom which has returned to the hyperfine ground state (F=1) may be excited again to the excited state $5P_{1/2}$ or the excited state $5P_{3/2}$ by the first light. Some of the atoms may return to the hyperfine ground state (F=1) and the other atoms may return to the hyperfine ground state (F=2) again. Accordingly, the atoms initially in the hyperfine ground state (F=1) can move to the hyperfine ground state (F=2).

In operation 703, the fluorescence measurement spectroscopy device 500 may cause the second light which excites an atom trapped in the vapor cell 100 in the hyperfine ground state (F=2) to the excited state 210 to be incident on the vapor cell 100. Here, the second light may have a wavelength of 778.1 nm.

Here, the area of the vapor cell 100 on which the first light is incident and the area of the vapor cell 100 on which the second light is incident may be spatially separated. This is because when the areas are spatially the same, the first light and the second light are combined to cause a nonlinear phenomenon.

In operation 705, the fluorescence measurement spectroscopy device 500 may cause the third light which excites an atom excited to the excited state 210 in the vapor cell 100 by the second light to the excited state $5D_{5/2}$ to be incident on the vapor cell 100. Here, the third light may have a wavelength of 778.1 nm that is the same as that of the second light. According to the embodiment, the fluorescence measurement spectroscopy device 500 may reflect the second light by using the reflection mirror instead of a separate photodiode in order to cause the third light to be incident on the vapor cell 100.

In operation 707, the fluorescence measurement spectroscopy device 500 can perform fluorescence measurement in which the photons which are emitted while the atoms in the excited state $5D_{5/2}$ in the vapor cell 100 return to the ground state $5S_{1/2}$ are detected.

Figure 8:
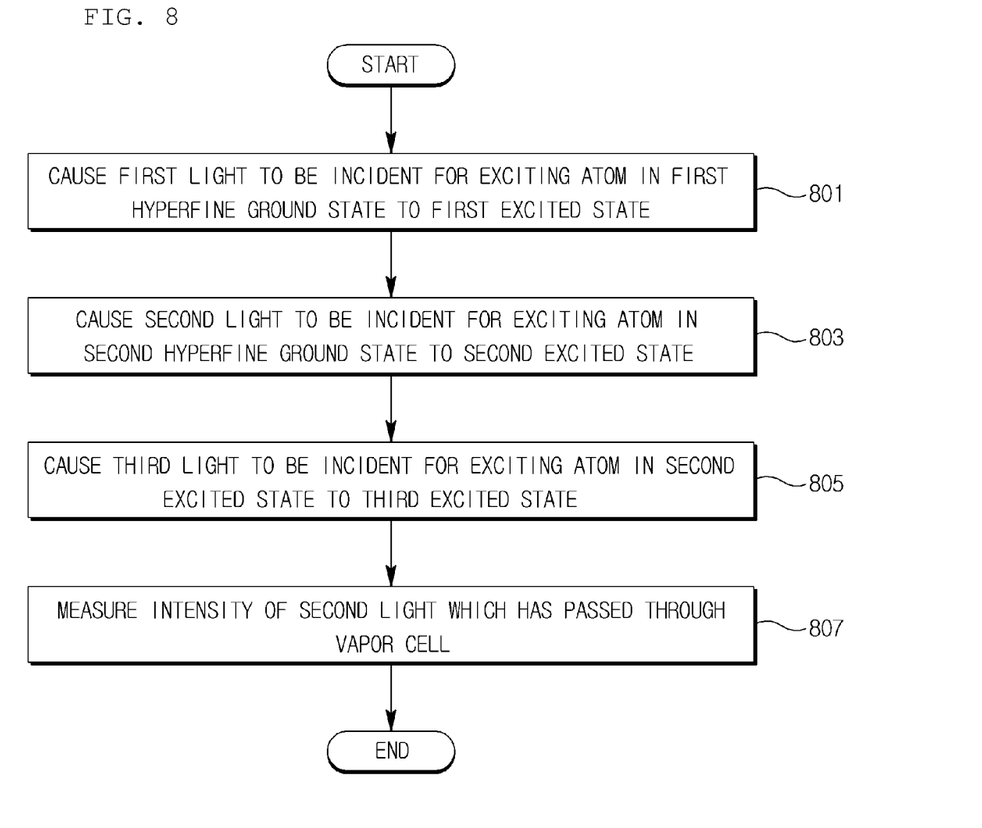
FIG. 8 is a flowchart showing the operation of an absorption measurement spectroscopy device according to various embodiments of the present invention.

FIG. 8 is a flowchart showing the operation of the absorption measurement spectroscopy device according to various embodiments of the present invention.

Referring to FIG. 8, in operation 801, the absorption measurement spectroscopy device 600 may cause the first light which excites an atom trapped in the vapor cell 100 in the hyperfine ground state (F=1) to the excited state $5P_{1/2}$ or the excited state $5P_{3/2}$ to be incident on the vapor cell 100. Here, the first light may have a wavelength of 795 nm or 780.2 nm. The atom excited to the excited state $5P_{1/2}$ or the excited state $5P_{3/2}$ by the first light may return to the ground state $5S_{1/2}$. Some of the atoms may return to the hyperfine ground state (F=1) and the other atoms may return to the hyperfine ground state (F=2). Further, the atom which has returned to the hyperfine ground state (F=1) may be excited again to the excited state $5P_{1/2}$ or the excited state $5P_{3/2}$ by the first light. Some of the atoms may return to the hyperfine ground state (F=1) and the other atoms may return to the hyperfine ground state (F=2) again. Accordingly, the atoms initially in the hyperfine ground state (F=1) can move to the hyperfine ground state (F=2).

In operation 803, the absorption measurement spectroscopy device 600 may cause the second light which excites an atom trapped in the vapor cell 100 in the hyperfine ground state (F=2) to the excited state $5P_{3/2}$ to be incident on the vapor cell 100. Here, the second light may have a wavelength of 780.2 nm.

Here, the area of the vapor cell 100 on which the first light is incident and the area of the vapor cell 100 on which the second light is incident may be spatially separated.

In operation 805, the absorption measurement spectroscopy device 600 may cause the third light which excites an atom excited to the excited state $5P_{3/2}$ in the vapor cell 100 by the second light to the excited state $5D_{5/2}$ to be incident on the vapor cell 100. Here, the third light may have a wavelength of 776 nm.

In operation 807, the absorption measurement spectroscopy device 600 may perform absorption measurement for detecting the intensity of the second light which has passed through the vapor cell 100.

Through the above-described fluorescence measurement of FIG. 7 or the absorption measurement of FIG. 8, the spectroscopy devices 500 and 600 may obtain precise frequencies required for atomic clock operation.

According to various embodiments, the operation method of the spectroscopy device (e.g., the fluorescence measurement spectroscopy device 500 of FIG. 5) may include causing the first light for exciting an atom trapped in the vapor cell (e.g., the vapor cell 100 of FIG. 5) in the first hyperfine ground state (e.g., the hyperfine ground state (F=1) of FIG. 4a or FIG. 4b) to the first excited state (e.g., the excited state $5P_{3/2}$ of FIG. 4a or the excited state $5P_{1/2}$ of FIG. 4b) to be incident on the vapor cell; causing the second light for exciting an atom trapped in the vapor cell in the second hyperfine ground state (e.g., the hyperfine ground state (F=2) of FIG. 4a or FIG. 4b) to the second excited state (e.g., the excited state 210 of FIG. 4a or FIG. 4b) to be incident on the vapor cell; causing the third light for exciting the atom in the second excited state to the third excited state (e.g., the excited state $5D_{5/2}$ of FIG. 4a of FIG. 4b) to be incident on the vapor cell; and detecting fluorescence which is emitted while the atom in the third excited state returns to the ground state.

According to various embodiments, the area of the vapor cell on which the first light is incident and the area of the vapor cell on which the second light is incident may be spatially different from each other.

According to various embodiments, the atom may be a rubidium atom, the first light may have a wavelength of 795 nm or 780.2 nm, and the second light may have a wavelength of 778.1 nm.

According to various embodiments, the third light may be generated by the reflection mirror which reflects the second light.

According to various embodiments, the operation method of the spectroscopy device (e.g., the absorption measurement spectroscopy device 600 of FIG. 6) may include causing the first light for exciting an atom trapped in the vapor cell (e.g., the vapor cell 100 of FIG. 6) in the first hyperfine ground state (e.g., the hyperfine ground state (F=1) of FIG. 4a or FIG. 4b) to the first excited state (e.g., the excited state $5P_{3/2}$, of FIG. 4a or the excited state $5P_{1/2}$ of FIG. 4b) to be incident on the vapor cell; causing the second light for exciting an atom trapped in the vapor cell in the second hyperfine ground state (e.g., the hyperfine ground state (F=2) of FIG. 2) to the second excited state (e.g., the excited state $5P_{3/2}$ of FIG. 2) to be incident on the vapor cell; causing the third light for exciting the atom in the second excited state to the third excited state (e.g., the excited state $5D_{5/2}$ of FIG. 2) to be incident on the vapor cell; and detecting an intensity of the second light which has passed through the vapor cell.

According to various embodiments, the area of the vapor cell on which the first light is incident and the area of the vapor cell on which the second light is incident may be spatially different from each other.

According to various embodiments, the atom may be a rubidium atom, the first light may have a wavelength of 795 nm or 780.2 nm, the second light may have a wavelength of 780.2 nm, and the third light has a wavelength of 776 nm. Here, the first light and the second light may have a wavelength of 780.2 nm and may be different from each other with a difference of approximately 0.01 nm or more.

According to various embodiments, the area where the second light is incident on the vapor cell is the center of the vapor cell, and the area where the first light is incident on the vapor cell has a donut shape and may include from the periphery of the area where the second light is incident to the outer periphery of the vapor cell.

What is claimed is:

1. A fluorescence measurement spectroscopy device comprising:
    a vapor cell trapping atoms;
    a first photodiode which generates a first light for exciting an atom trapped in the vapor cell in a first hyperfine ground state to a first excited state and causes the first light to be incident on the vapor cell;
    a second photodiode which generates a second light for exciting an atom trapped in the vapor cell in a second hyperfine ground state to a second excited state and causes the second light to be incident on the vapor cell;
    a reflection mirror which reflects the second light which has been generated by the second photodiode and has passed through from the vapor cell, and causes the second light to be incident again on the vapor cell; and
    a photodetector which detects fluorescence which is emitted while the atoms excited to a third excited state from the second excited state by the second light incident by the reflection mirror return to the ground state,
    wherein an area of the vapor cell on which the first light generated by the first photodiode is incident and an area of the vapor cell on which the second light generated by the second photodiode is incident are spatially separated.

2. The fluorescence measurement spectroscopy device of claim 1,
    wherein the atom is a rubidium atom,
    wherein the first light has a wavelength of 795 nm or 780.2 nm,
    and wherein the second light has a wavelength of 778.1 nm.

3. The fluorescence measurement spectroscopy device of claim 1,
    wherein an area where the second light is incident on the vapor cell is a center of the vapor cell,
    and wherein an area where the first light is incident on the vapor cell has a donut shape and comprises from a periphery of the area where the second light is incident to an outer periphery of the vapor cell.

4. An absorption measurement spectroscopy device comprising:
    a vapor cell trapping atoms;
    a first photodiode which generates a first light for exciting an atom trapped in the vapor cell in a first hyperfine ground state to a first excited state and causes the first light to be incident on the vapor cell;
    a second photodiode which generates a second light for exciting an atom trapped in the vapor cell in a second hyperfine ground state to a second excited state and causes the second light to be incident on the vapor cell;
    a third photodiode which generates a third light for exciting the atom in the second excited state to a third excited state and causes the third light to be incident on the vapor cell;
    a photodetector which detects an intensity of the second light which has passed through the vapor cell; and
    a photo isolator which transmits only the second light among the lights which have passed through the vapor cell to the photodetector,
    wherein an area of the vapor cell on which the first light generated by the first photodiode is incident and an area of the vapor cell on which the second light generated by the second photodiode is incident are spatially separated.

5. The absorption measurement spectroscopy device of claim 4,
    wherein the atom is a rubidium atom,
    wherein the first light has a wavelength of 795 nm or 780.2 nm,
    wherein the second light has a wavelength of 780.2 nm, and wherein the third light has a wavelength of 776 nm.

6. The absorption measurement spectroscopy device of claim 4,
    wherein an area where the second light and the third light are incident on the vapor cell is a center of the vapor cell,
    and wherein an area where the first light is incident on the vapor cell has a donut shape and comprises from a periphery of the area where the second light is incident to an outer periphery of the vapor cell.

7. An operation method of the spectroscopy device, the operation method comprising:
    causing a first light for exciting an atom trapped in a vapor cell in a first hyperfine ground state to a first excited state to be incident on the vapor cell;
    causing a second light for exciting an atom trapped in the vapor cell in a second hyperfine ground state to a second excited state to be incident on the vapor cell;
    causing a third light for exciting the atom in the second excited state to a third excited state to be incident on the vapor cell; and
    detecting fluorescence which is emitted while the atom in the third excited state returns to the ground state,
    wherein an area of the vapor cell on which the first light is incident and an area of the vapor cell on which the second light is incident are spatially different from each other.

8. The operation method of claim 7,
    wherein the atom is a rubidium atom,
    wherein the first light has a wavelength of 795 nm or 780.2 nm,
    and wherein the second light has a wavelength of 778.1 nm.

9. The operation method of claim 7,
    wherein an area where the second light is incident on the vapor cell is a center of the vapor cell,
    and wherein an area where the first light is incident on the vapor cell has a donut shape and comprises from a periphery of the area where the second light is incident to an outer periphery of the vapor cell.

10. The operation method of claim 7, wherein the third light is generated by a reflection mirror which reflects the second light.

11. An operation method of the spectroscopy device, the operation method comprising:

causing a first light for exciting an atom trapped in a vapor cell in a first hyperfine ground state to a first excited state to be incident on the vapor cell;

causing a second light for exciting an atom trapped in the vapor cell in a second hyperfine ground state to a second excited state to be incident on the vapor cell;

causing a third light for exciting the atom in the second excited state to a third excited state to be incident on the vapor cell; and detecting an intensity of the second light which has passed through the vapor cell, wherein an area of the vapor cell on which the first light is incident and an area of the vapor cell on which the second light is incident are spatially different from each other.

12. The operation method of claim 11,
wherein the atom is a rubidium atom,
wherein the first light has a wavelength of 795 nm or 780.2 nm,
wherein the second light has a wavelength of 780.2 nm, and wherein the third light has a wavelength of 776 nm.

13. The operation method of claim 11,
wherein an area where the second light is incident on the vapor cell is a center of the vapor cell,
and wherein an area where the first light is incident on the vapor cell has a donut shape and comprises from a periphery of the area where the second light is incident to an outer periphery of the vapor cell.

* * * * *